(12) United States Patent
Lowth et al.

(10) Patent No.: US 9,789,542 B2
(45) Date of Patent: Oct. 17, 2017

(54) FIXTURE APPARATUS

(71) Applicant: ROLLS-ROYCE PLC, London (GB)

(72) Inventors: Stewart Lowth, Nottingham (GB);
Dragos A. Axinte, Nottingham (GB);
Mark H. Raffles, Nottingham (GB);
Kiran Kolluru, Nottingham (GB)

(73) Assignee: ROLLS-ROYCE plc, London (GB)

( * ) Notice: Subject to any disclaimer, the term of this patent is extended or adjusted under 35 U.S.C. 154(b) by 6 days.

(21) Appl. No.: 14/865,921

(22) Filed: Sep. 25, 2015

(65) Prior Publication Data

US 2016/0096225 A1 Apr. 7, 2016

(30) Foreign Application Priority Data

Oct. 2, 2014 (GB) .................................. 1417414.8

(51) Int. Cl.
| | |
|---|---|
| B25B 11/00 | (2006.01) |
| B22F 3/105 | (2006.01) |
| B23Q 1/03 | (2006.01) |
| B33Y 80/00 | (2015.01) |
| B25B 5/16 | (2006.01) |
| B23Q 11/00 | (2006.01) |
| B33Y 10/00 | (2015.01) |
| B29C 67/00 | (2017.01) |

(Continued)

(52) U.S. Cl.
CPC ............ B22F 3/1055 (2013.01); B23Q 1/032 (2013.01); B25B 5/163 (2013.01); B25B 11/00 (2013.01); B33Y 80/00 (2014.12); *B22F 2003/1058* (2013.01); *B23Q 11/0032* (2013.01); *B29C 67/0077* (2013.01); *B29K 2025/06* (2013.01); *B29K 2029/04* (2013.01); *B33Y 10/00* (2014.12)

(58) Field of Classification Search
CPC .. B29C 67/00; B23B 3/12; B23B 3/14; B32B 7/02; B32B 3/26; B32B 3/28; B08B 3/00; A43B 13/18
See application file for complete search history.

(56) References Cited

U.S. PATENT DOCUMENTS

| | | | | |
|---|---|---|---|---|
| 2,985,971 A | * | 5/1961 | Murawski | ............ A43B 13/184 36/29 |
| 3,079,708 A | * | 3/1963 | Hack | .................... A43B 13/181 36/28 |

(Continued)

FOREIGN PATENT DOCUMENTS

| | | |
|---|---|---|
| DE | 29721728 U1 | 4/1998 |
| DE | 103 40 052 A1 | 5/2005 |

(Continued)

OTHER PUBLICATIONS

May 20, 2016 Search Report issued in European Patent Application No. 15186922.

(Continued)

*Primary Examiner* — Larry E Waggle, Jr.
*Assistant Examiner* — Tyrone V Hall, Jr.
(74) *Attorney, Agent, or Firm* — Oliff PLC

(57) ABSTRACT

Fixture Apparatus and methods of manufacturing fixture apparatus. Fixture apparatus comprising: a first body to at least partially support an object, the first body including a structure having variable stiffness along at least a first axis of the first body.

15 Claims, 13 Drawing Sheets

(51) Int. Cl.
  *B29K 25/00* (2006.01)
  *B29K 29/00* (2006.01)

(56) References Cited

U.S. PATENT DOCUMENTS

| | | | | |
|---|---|---|---|---|
| 3,087,262 | A * | 4/1963 | Russell | A43B 13/181 36/28 |
| 4,235,026 | A * | 11/1980 | Plagenhoef | A43B 13/181 36/28 |
| 4,684,113 | A | 8/1987 | Douglas et al. | |
| 4,817,304 | A * | 4/1989 | Parker | A43B 13/20 36/114 |
| 5,364,083 | A | 11/1994 | Ross et al. | |
| 5,454,069 | A | 9/1995 | Knapp et al. | |
| 5,457,868 | A | 10/1995 | Blaimschein | |
| 6,182,929 | B1 * | 2/2001 | Martin | B63B 1/248 244/219 |
| 6,250,619 | B1 | 6/2001 | Cook et al. | |
| 6,447,478 | B1 * | 9/2002 | Maynard | F03G 7/065 600/151 |
| 6,969,548 | B1 * | 11/2005 | Goldfine | A41D 31/0061 206/523 |
| 7,678,440 | B1 * | 3/2010 | McKnight | B32B 3/26 148/563 |
| 7,892,630 | B1 * | 2/2011 | McKnight | B32B 3/10 428/114 |
| 8,459,280 | B2 * | 6/2013 | Swanson | B08B 3/104 134/117 |
| 8,475,074 | B1 * | 7/2013 | Henry | B32B 3/26 148/563 |
| 2002/0185472 | A1 | 12/2002 | Nordquist et al. | |
| 2004/0197519 | A1 * | 10/2004 | Elzey | B32B 3/28 428/68 |
| 2009/0140482 | A1 | 6/2009 | Saberton et al. | |
| 2009/0250196 | A1 | 10/2009 | Batty et al. | |
| 2011/0180145 | A1 | 7/2011 | dos Santos e Lucato et al. | |

FOREIGN PATENT DOCUMENTS

| | | |
|---|---|---|
| EP | 1 604 779 A1 | 12/2005 |
| EP | 2 487 005 A2 | 8/2012 |
| WO | 03068457 A1 | 8/2003 |
| WO | 2005/061182 A2 | 7/2005 |
| WO | 2009029171 A1 | 3/2009 |
| WO | 2011/064349 A1 | 6/2011 |
| WO | 2012/065614 A1 | 5/2012 |
| WO | 2012/132773 A1 | 10/2012 |

OTHER PUBLICATIONS

Feb. 19, 2016 Partial Search Report issued in European Patent Application No. 15 18 6922.

* cited by examiner

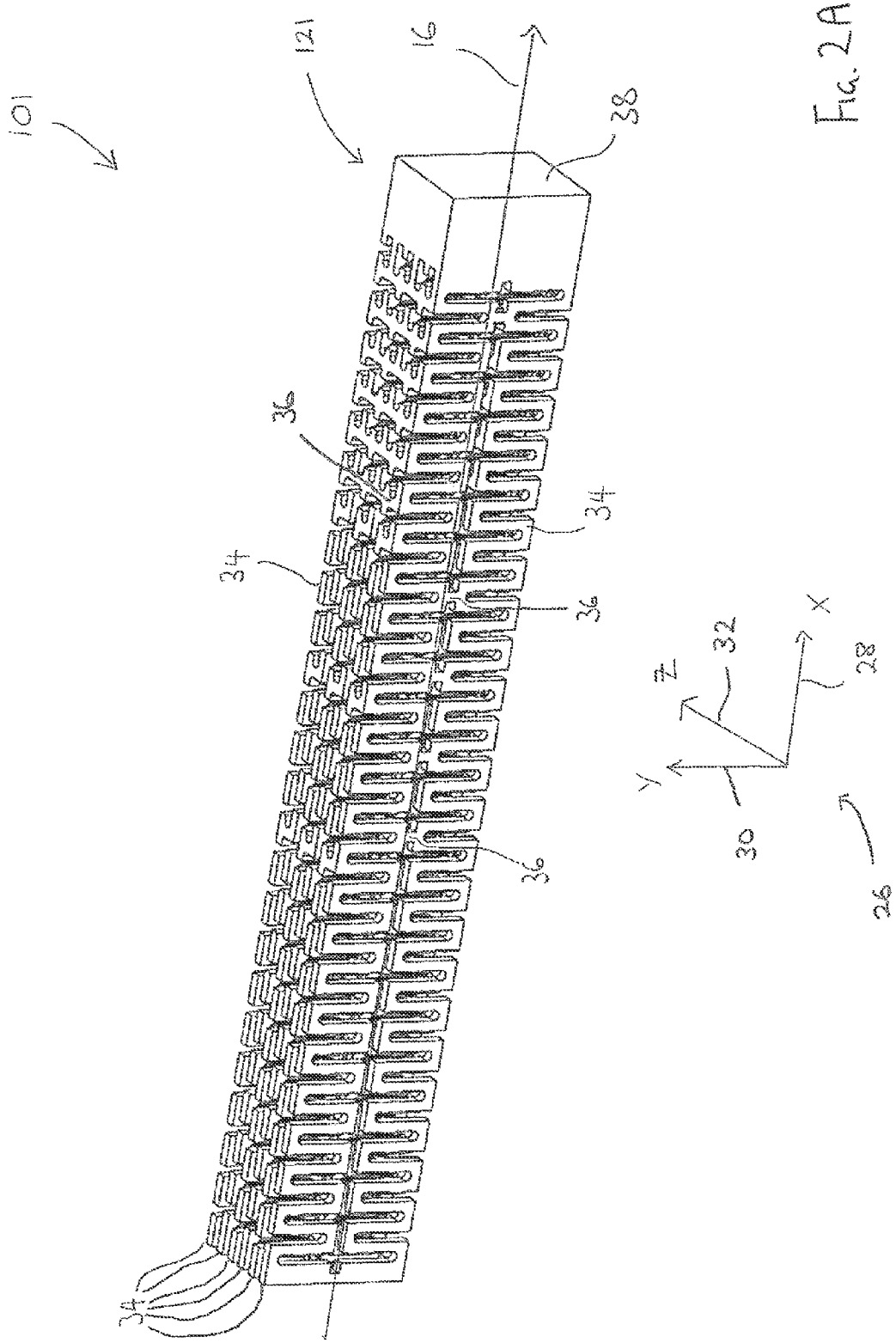

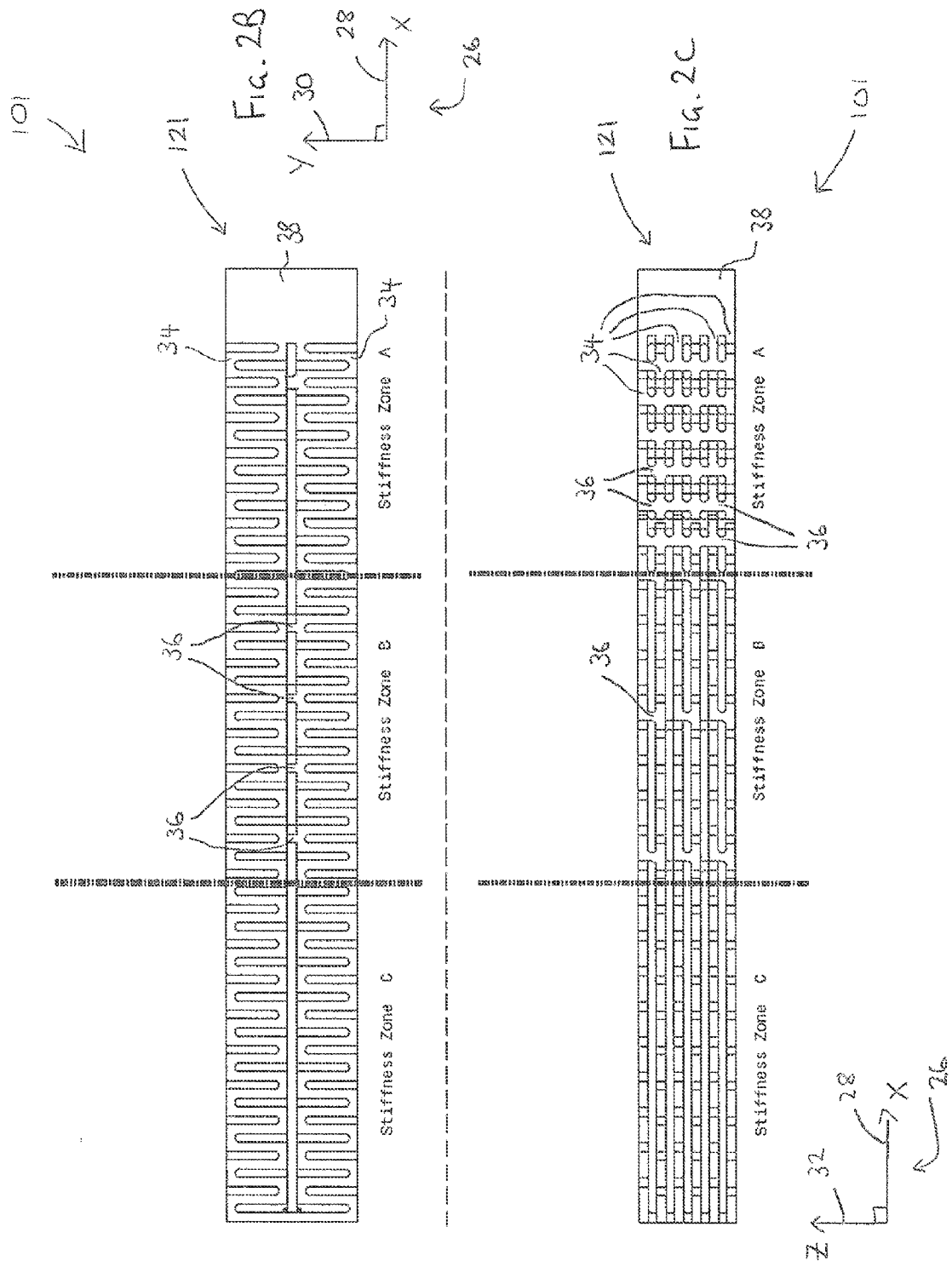

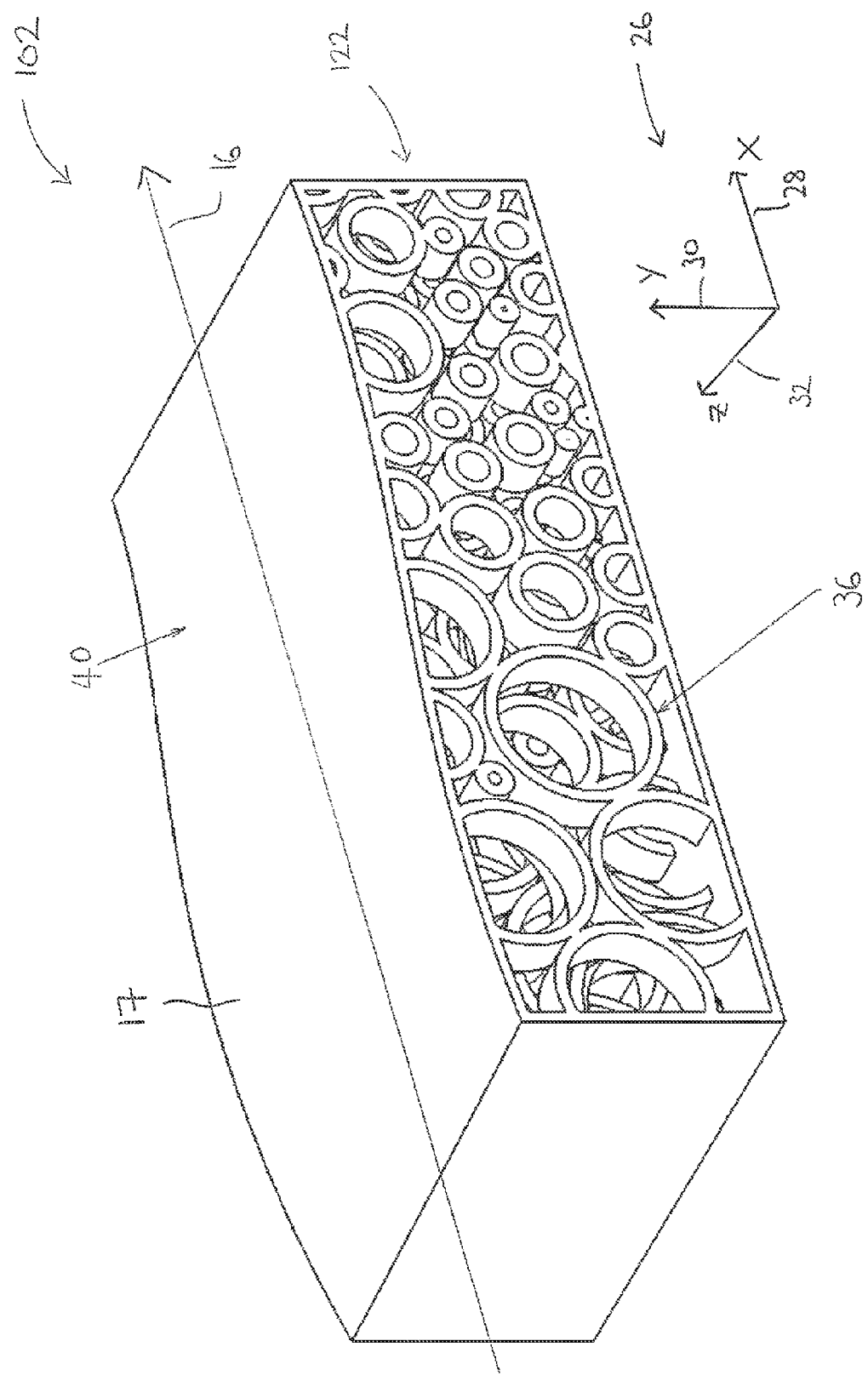

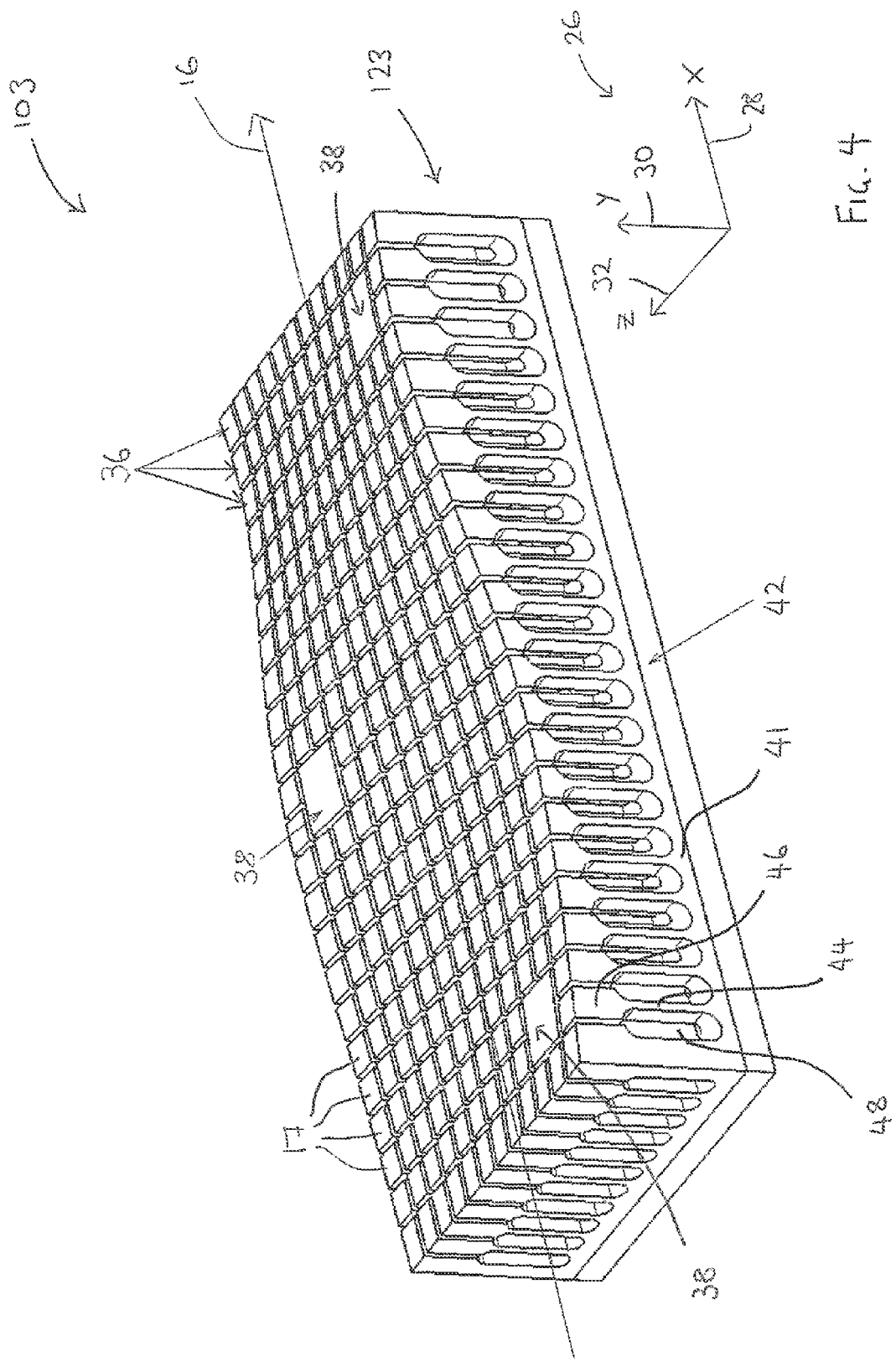

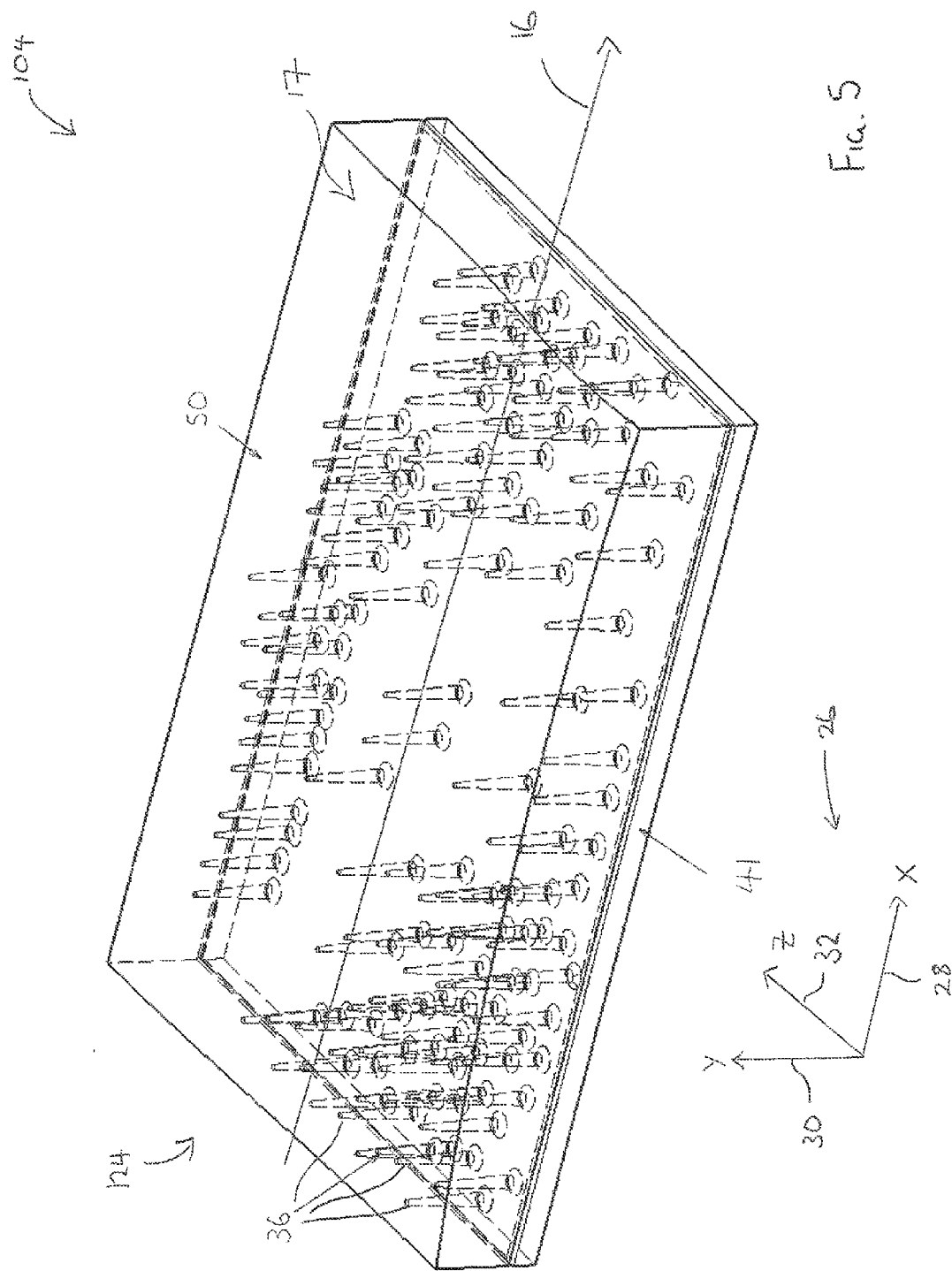

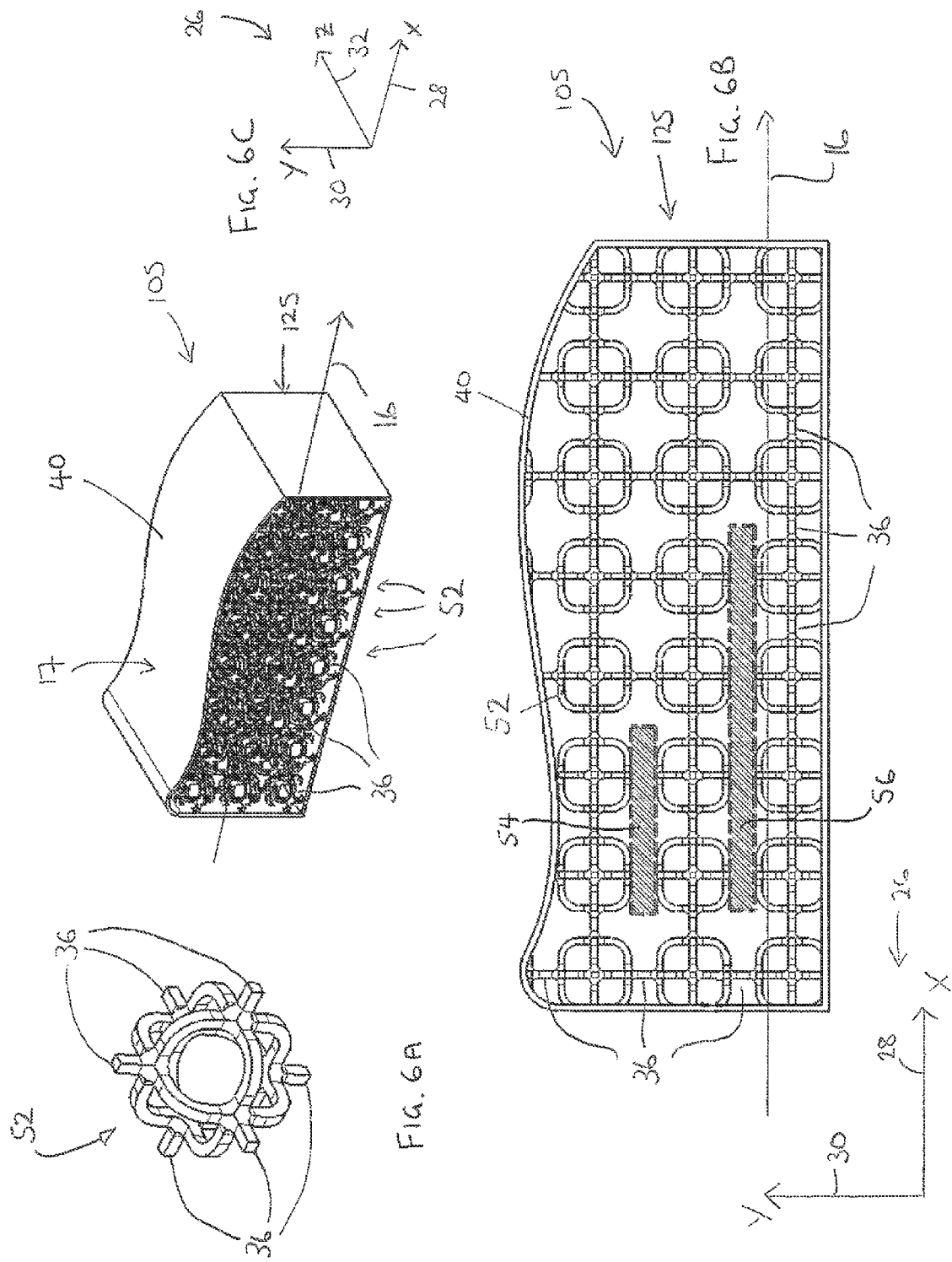

FIXTURE APPARATUS

TECHNOLOGICAL FIELD

The present disclosure concerns fixture apparatus and methods of manufacturing fixture apparatus.

BACKGROUND

Fixtures are usually used to support (and often retain) an object in position and/or orientation while a machining operation is being performed on the object. For example, a clamp may retain a component of a gas turbine engine (such as a turbine blade) while a machining operation is being performed on the component.

BRIEF SUMMARY

According to various, but not necessarily all, embodiments of the invention there is provided fixture apparatus comprising: a first body to at least partially support an object, the first body including a structure having variable stiffness along at least a first axis of the first body.

The variable stiffness of the structure may be tuned to the object to be supported.

The structure may have resonant frequencies tuned to dampen machining vibrational frequencies to prevent resonant vibration of the object during a machining operation.

The variable stiffness of the structure may be tuned to a machining process to be performed on the object.

The structure may comprise a plurality of support members, at least one characteristic of the plurality of support members may vary along at least the first axis of the first body to provide the variable stiffness.

The plurality of support members may be tuned to dampen out machining vibrational frequencies to prevent resonant vibration of the object during a machining operation.

The at least one characteristic of the plurality of support members may be one of: length of the support members; a thickness of the support members; density of the support members; material of the support members.

The support members may extend perpendicularly to the first axis of the first body.

The structure may include a plurality of elongate members. The plurality of support members may form a plurality of cross links that extend between adjacent ones of the plurality of elongate members.

At least some of the plurality of elongate members may have a serpentine configuration and may be arranged to define a plurality of adjacent columns. A first portion of the support members may extend between adjacent columns in a first dimension. A second portion of the support members may extend between adjacent elongate members within a column in a second dimension.

The plurality of support members may define closed cells.

The structure may further comprise resilient material positioned between at least some of the support members.

The structure of the first body may include at least one rigid member to enable the object to be positioned relative to the fixture apparatus at a predetermined location.

The fixture apparatus may further comprise a second body, coupled to the first body, to provide a contact surface for the object.

The contact surface of the second body may be shaped to correspond with a surface of the object.

The second body includes a structure having variable stiffness along at least a first axis of the second body.

The first body may further comprise at least one sensor in the structure.

The structure of the first body may have variable stiffness along a second axis of the first body.

According to various, but not necessarily all, embodiments of the invention there is provided a fixture comprising fixture apparatus as described in any of the preceding paragraphs.

According to various, but not necessarily all, embodiments of the invention there is provided apparatus comprising: the fixture apparatus as described in any of the preceding paragraphs; and an object supported by the fixture apparatus.

The fixture apparatus may be printed on the object and may have a connecting interface with the object.

The fixture apparatus and the object may be printed together and may be integral to one another.

The fixture apparatus may comprise a dissolvable material.

According to various, but not necessarily all, embodiments of the invention there is provided a method of manufacturing fixture apparatus, the method comprising: providing a first body to at least partially support an object, the first body including a structure having variable stiffness along at least a first axis of the first body.

The method may further comprise providing a plurality of support members. At least one characteristic of the plurality of support members may vary along at least the first axis of the first body to provide the variable stiffness.

The method may further comprise providing a plurality of elongate members. The plurality of support members may form a plurality of cross links that extend between adjacent ones of the plurality of elongate members.

The method may further comprise providing resilient material between at least some of the support members.

The method may further comprise providing at least one rigid member to enable the object to be positioned relative to the fixture apparatus at a predetermined location.

The method may further comprise coupling a second body to the first body to provide a contact surface of the fixture apparatus for the object.

The second body may include a structure having variable stiffness along at least a first axis of the second body.

The method may further comprise providing at least one sensor in the structure.

The fixture apparatus may be provided by printing the fixture apparatus on the object. The fixture apparatus and the object may have a connecting interface.

The fixture apparatus may be provided by printing the object and the fixture apparatus together so that they are integral to one another.

The fixture apparatus may comprise a dissolvable material. The method may further comprise dissolving the fixture apparatus.

The skilled person will appreciate that except where mutually exclusive, a feature described in relation to any one of the above aspects of the invention may be applied mutatis mutandis to any other aspect of the invention.

BRIEF DESCRIPTION

Embodiments of the invention will now be described by way of example only, with reference to the Figures, in which:

FIG. 2A illustrates a perspective view diagram of fixture apparatus according to various examples;

FIG. 2B illustrates a front view diagram of the fixture apparatus illustrated in FIG. 2A;

FIG. 2C illustrates a plan view diagram of the fixture apparatus illustrated in FIGS. 2A and 2B;

FIG. 3 illustrates a cross sectional perspective view diagram of another fixture apparatus according to various examples;

FIG. 4 illustrates a cross sectional perspective view diagram of a further fixture apparatus according to various examples;

FIG. 5 illustrates a perspective view diagram of another fixture apparatus according to various examples;

FIG. 6A illustrates a perspective view diagram of a support member according to various examples;

FIG. 6B illustrates a cross sectional side view diagram of a further fixture apparatus including a plurality of support members as illustrated in FIG. 6A;

FIG. 6C illustrates a cross sectional perspective view diagram of the fixture apparatus illustrated in FIG. 6B;

DETAILED DESCRIPTION

In the following description, the wording 'contact', 'abut', 'connect' and 'couple', and their derivatives, mean operationally contacting, abutting, connected and coupled. It should be appreciated that any number of intervening components may exist, include no intervening components.

Figure 1:
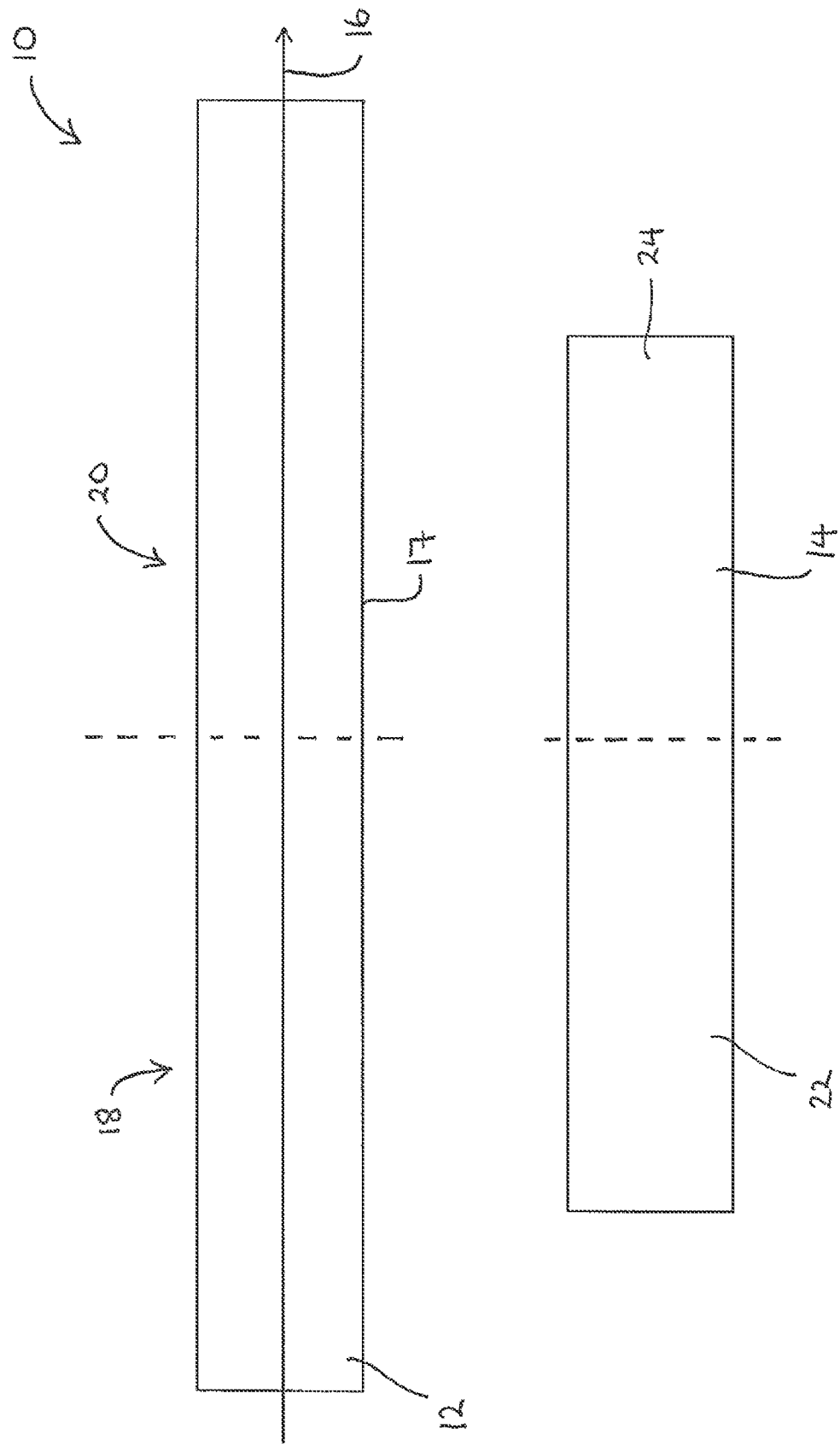
FIG. 1 illustrates a schematic diagram of fixture apparatus according to various examples.

FIG. 1 illustrates fixture apparatus 10 comprising a first body 12 to at least partially support an object 14, the first body 12 including a structure having variable stiffness along at least a first axis 16 of the first body 12. The variable stiffness of the first body 12 along the first axis 16 may reduce vibration caused by machining operations on the object 14 and may reduce damage to the object 14 and/or the fixture apparatus 10. The variable stiffness of the first body 12 may also reduce tool wear and damage to the bearings of the machine performing the operation.

The fixture apparatus 10 may be any suitable apparatus for at least partially supporting (and in some examples, for at least partially retaining) the object 14 in a position and/or orientation to enable a machining operation to be performed on the object 14. For example, the fixture apparatus 10 may be a clamp or a vice or a support structure that is arranged to support or retain the object 14 in a desired position and orientation so that a machining operation (such as welding, drilling or honing) may be performed on the object 14.

The fixture apparatus 10 may be a module. As used herein, the term 'module' means a component or a part that may be assembled with further components or parts by an end manufacturer to form an end product. For example, where the fixture apparatus 10 is a module, a vice may be formed by assembling the fixture apparatus 10 with another member (for example, another fixture apparatus 10) to provide two jaws between which the object 14 may be clamped.

The object 14 may be any article, device, apparatus, component or module. For example, the object 14 may be a component of a gas turbine engine such as a compressor blade, guide vane, or turbine blade.

The first body 12 may comprise any suitable material or materials for supporting (and retaining) the object 14. For example, the first body 12 may comprise one or more of: a rubber, a plastic, a metal, or a ceramic. In some examples, the first body 12 may be formed by a three dimensional printing process (which may also be referred to as additive manufacturing) such as selective laser sintering (SLS), direct metal laser sintering (DMLS), selective laser melting (SLM), or electron beam melting (EBM).

The first body 12 may include any suitable structure that provides a variable stiffness at least along the first axis 16. In some examples, the first body 12 may include a structure that provides a variable stiffness along a second axis (which may be perpendicular to the first axis). Various structures of the first body 12 are described in the following paragraphs with reference to FIGS. 2 to 9. It should be appreciated that these examples are non-limiting and that the first body 12 may have an alternative structure to those described herein.

In some examples, the first body 12 includes a surface 17 to contact the object 14 to support and retain the object 14. The contact surface 17 may have a three dimensional shape that corresponds to, and mates with the object 14. For example, where the object 14 has a concave surface, the contact surface 17 may have a convex shape that is arranged to mate with the concave surface of the object 14. Alternatively, the contact surface 17 may not be shaped to mate with the object 14.

The variable stiffness of the structure of the first body 12 may be tuned to the object 14 to be supported and retained. For example, where the object 14 includes a part having relatively delicate protrusions, the stiffness of the first body 12 for receiving that part of the object 14 may be relatively low to enable the first body 12 to form a corresponding shape around the object 14. Additionally, or alternatively, the variable stiffness of the structure of the first body 12 may be tuned to a machining process to be performed on the object 14. For example, where the object 14 includes a part that will be subject to relatively high forces during a machining process, the stiffness of the body 12 for receiving that part of the object 14 may be relatively low to absorb energy from the machining process. The structure of the first body 12 may also be tuned in terms of frequency of vibration. For example, the structure of the first body 12 may be tuned to dampen-out machining vibrational frequencies to prevent resonant vibration within the object 14 during the machining operation.

By way of an example, the first body 12 may include a first part 18 having a first stiffness and a second part 20 having a second stiffness. The variable stiffness of the structure of the first body 12 is tuned so that the first stiffness is less than the second stiffness. The object 14 (in this example, a turbine blade) includes a first part 22 (the aerofoil of the turbine blade) and a second part 24 (the root of the turbine blade). During a machining operation, the fixture apparatus 10 retains the turbine blade 14 so that the aerofoil 22 of the turbine blade 14 is retained by the first part 18 of the fixture apparatus 10 and so that the root 24 of the turbine blade 14 is retained by the second part 20 of the fixture apparatus. The machining operation is then performed on the root 24 of the turbine blade 14 and the relatively low stiffness of the first part 18 of the first body 12 may advantageously dampen vibrations caused by the machining operation and prevent damage being caused to the relatively fragile aerofoil 22 of the turbine blade 14.

It should be appreciated that the fixture apparatus 10 is arranged so that two or more parts (having different stiffness values) of the first body 12 support and retain the object 14. In other words, across the surface area of the contact surface 17 for retaining the object 14, the first body 12 has a plurality of zones along the first axis 16 that have different stiffness values. It should also be appreciated that the first body 12 may have any number of parts that retain the object 14 and have different stiffness values. Additionally, the variation in stiffness across the first body 12 may occur on the macroscopic scale (that is, the parts of the first body 12 having different stiffness values may be on the scale visible to the human eye).

The fixture apparatus 10 may provide several advantages. First, where the fixture apparatus 10 is manufactured via three dimensional printing, the fixture apparatus 10 may be cheaper to manufacture than a traditional fixture, may be manufactured to optimally retain a particular object, and may be iteratively improved during the production process. Second, damping of vibrations caused by manufacturing is inherent to the structure of the fixture apparatus 10 and consequently, no maintenance or external energy source may be required to provide the damping effect. Third, the fixture apparatus 10, once added/attached to an object 14 may be used across multiple manufacturing operations allowing a more consistent production process. Fourth, since the fixture apparatus 10 has a variable stiffness body, the fixture apparatus 10 may be used to retain and support complex components (such as aerofoils). Fifth, wear and subsequent maintenance may be circumvented as each fixture apparatus 10 may only be used for a single component. This may advantageously lead to fixturing consistency over the total life of an object. Sixth, fixture apparatus 10 that are not in use do not need to be physically stored and may be discarded, since a new fixture apparatus 10 may be three dimensionally printed in a relatively short period of time. Seventh, the fixture apparatus 10 may require less time to be designed and manufactured since the fixture apparatus 10 may be designed and manufactured before use using a three dimensional printer. Eighth, use of the fixture apparatus 10 may improve the result of a machining operation by enabling improvement of surface finish, higher dimensional accuracy, reduced tool wear, and less strain on the machine tool spindle bearings.

FIGS. 2A, 2B and 2C illustrate diagrams of another fixture apparatus 101 according to various examples. FIGS. 2A, 2B and 2C also illustrate a Cartesian coordinate system 26 including an X axis 28, a Y axis 30 and a Z axis 32 that are orthogonal to one another. The fixture apparatus 101 is similar to the fixture apparatus 10 illustrated in FIG. 1 and where the features are similar, the same reference numerals are used.

The first axis 16 of the body 121 extends parallel to the X axis 28 and is orthogonal to the Y axis 30 and to the Z axis 32. The first axis 16 may be referred as a longitudinal axis in this example. The body 121 includes a plurality of elongate members 34 that extend parallel to the first axis 16 (and hence parallel to the X axis 28). The elongate members 34 may comprise any suitable material, and may comprise a plastic for example.

In this example, the elongate members 34 have a serpentine configuration (in other words, the elongate members 34 snake back and forth in the X axis 28 and the Y axis 30). Additionally, the elongate members 34 are arranged to define a plurality of adjacent columns (two columns of elongate members 34 are illustrated in FIG. 2). It should be appreciated that the plurality of elongate members 34 may have different shapes and be arranged differently in other examples. For example, the elongate members 34 may be arranged in straight lines and may be arranged in any number of columns.

The structure of the body 121 comprises a plurality of support members 36 that form a plurality of cross links that extend between adjacent ones of the plurality of elongate members 34. In particular, a first portion of the support members 36 extends perpendicularly to the first axis 16 of the first body 121 in the Y axis 30 and a second portion extends perpendicularly to the first axis 16 in the Z axis 32. Consequently, a first portion of the support members 36 extend between adjacent columns of elongate members 34 in a first dimension (the Y axis 30), and a second portion of the support members 36 extend between adjacent elongate members 34 within a column in a second dimension (the Z axis 32).

At least one characteristic of the plurality of support members 36 varies along the first axis 16 of the body 121 to provide the variable stiffness of the fixture apparatus 101. The characteristics of the plurality of support members 36 that vary the stiffness of the body 121 include (but are not limited to): dimensions of the support members 36 (i.e. the length of the support members 36 and a thickness of the support members 36); density of the support members 36; and the material of the support members 36 (which may be the same material as the elongate members 34, or may be a different material to the elongate members 34). The plurality of support members may also be tuned (for example, by tuning at least one characteristic of the support members) to dampen out machining vibrational frequencies to prevent resonant vibration of an object during a machining operation.

It should be appreciated that the stiffness of a fixture apparatus decreases as the length of support members 36 increases. The stiffness of a fixture apparatus increases as a thickness of the support members 36 increases. The stiffness of a fixture apparatus increases as the density of support members 36 increases. The stiffness of a fixture apparatus increases as the stiffness of the material of the support members 36 increases.

As illustrated in FIG. 2B, the body 121 includes three parts (stiffness zone A, stiffness zone B, and stiffness zone C) that have different stiffness values along the Y axis 30. In this example, the variance in stiffness is provided by the different densities of support members 36 in the stiffness zones A, B, C. In particular, stiffness zone C has a low density of support members 36 that extend along the Y axis 30 and therefore has low stiffness in the Y axis 30. Stiffness zone B has a high density of support members 36 that extend along the Y axis 30 and therefore has a high stiffness in the Y axis 30. Stiffness zone A has a medium density of support members 36 that extend along the Y axis 30 and therefore has a medium stiffness in the Y axis 30.

As illustrated in FIG. 2C, the body 121 also includes three parts (stiffness zone A, stiffness zone B, and stiffness zone C) that have different stiffness values along the Z axis 32. In this example, the variance in stiffness is provided by the different densities of support members 36 in the stiffness zones A, B, C. In particular, stiffness zone C has a low density of support members 36 that extend along the Z axis 30 and therefore has low stiffness in the Z axis 32. Stiffness zone B has a medium density of support members 36 that extend along the Z axis 32 and therefore has a medium stiffness in the Z axis 32. Stiffness zone A has a high density of support members 36 that extend along the Z axis 32 and therefore has a high stiffness in the Z axis 32.

Therefore, a part of the body 121 may advantageously have different stiffness values in different directions. For example, stiffness zone A has a medium stiffness in the Y axis 30, and a high stiffness in the Z axis. By way of another example, stiffness zone B has a high stiffness has a high stiffness in the Y axis 30, and a medium stiffness in the Z axis 32.

The structure of the body 121 may further comprise a resilient material positioned between at least some of the support members 36. For example, rubber may be provided between at least some of the elongate members 34 and between at least some of the support members 36 to locally increase stiffness.

The structure of the body 121 may include at least one rigid member 38 to enable an object to be positioned relative to the fixture apparatus 101 at a predetermined location. In other words, the at least one rigid member 38 may provide a datum point for positioning an object relative to the fixture apparatus 101. In this example, the body 121 includes a relatively solid, rigid block of plastic that is positioned at an end of the body 121 to provide the rigid member 38. The rigid member 38 may comprise the same material as the elongate members 34 and/or the support members 36, or may comprise a different material.

FIG. 3 illustrates a cross sectional perspective view diagram of another fixture apparatus 102 according to various examples. The fixture apparatus 102 is similar to the fixture apparatus 10, 101 and where the features are similar, the same reference numerals are used. FIG. 3 also illustrates a Cartesian coordinate axis 26 that includes an X axis 28, a Y axis 30 and a Z axis 32 that are orthogonal to one another.

The fixture apparatus 102 includes a body 122 comprising a plurality of support members 36 and a cover 40 for housing the closed cells 36. The cover 40 may provide the contact surface 17 for supporting (and retaining) an object. The structure of the body 122 has variable stiffness along at least a first axis 16 of the body 122 (the first axis 16 being parallel to the X axis 28 in this example).

The support members 36 define a plurality of closed circular cells. The variable stiffness of the body 122 along the first axis 16 may be provided by varying a characteristic of the closed cells. For example, the variable stiffness along the first axis 16 may be provided by having varying sizes of the closed cells 36 along the first axis 16. In particular, smaller closed cells 36 have a higher density and require a higher force to compress and consequently create areas of high stiffness. Larger closed cells 36 have a lower density and require a lower force to compress and consequently create areas of low stiffness.

The variable stiffness of the body 122 may additionally or alternatively be provided by varying the thickness of the walls of the closed cells 36 along the first axis 16 (where thicker walls of the closed cells 36 increase the stiffness of the body 122). Furthermore, the variable stiffness of the body 122 may additionally or alternatively be provided by varying the material of the closed cells 36 along the first axis 16.

In some examples, at least some of the closed cells 36 may be filled with a resilient material (such as rubber) to increase the stiffness of the fixture apparatus 102 at that area. Additionally or alternatively, the space between at least some of the closed cells 36 may be filled with a resilient material to increase the stiffness of the fixture apparatus 102 at that area.

FIG. 4 illustrates a cross sectional perspective view diagram of a further fixture apparatus 103 according to various examples. The fixture apparatus 103 is similar to the fixture apparatus 10, 101, 102 and where the features are similar, the same reference numerals are used. FIG. 4 also illustrates a Cartesian coordinate axis 26 that includes an X axis 28, a Y axis 30 and a Z axis 32 that are orthogonal to one another.

The fixture apparatus 103 includes a body 123 comprising a plurality of support members 36, a first substrate 41, and may also include a second substrate 42 that provides a backing plate for the support members 36 and may provide additional stiffness to the fixture apparatus 103. The structure of the body 123 has variable stiffness along at least a first axis 16 of the body 123 (the first axis 16 being parallel to the X axis 28 in this example).

The plurality of support members 36 are arranged in an array and extend parallel to the Y axis 30 and include a first part 44 and a second part 46. The first part 44 extends from the first substrate 41 at a first end and is coupled to the second part 46 at a second end. The first part 44 may be integral with the first substrate 41 and/or with the second part 46. The second part 46 extends from the first part 44 and may define a part of a contact surface 17 for supporting and retaining an object. The thickness of the first part 44 in the X axis 28 is less than the thickness of the second part 46 and consequently, adjacent support members 36 define a cavity 48 there between.

The variable stiffness of the body 123 along the first axis 16 may be provided by varying the length of the first part 44 (and thereby varying the length of the cavity 48), such that where the length of the first part 44 is high, the stiffness of the fixture apparatus 103 at that location is low. The variable stiffness of the body 123 may additionally or alternatively be provided by varying the thickness of the first part 44 in the X axis 28, such that where the thickness is high, the stiffness of the fixture apparatus 103 at that location is high. Furthermore, the variable stiffness of the body 123 may additionally or alternatively be provided by varying the material of the support members 36 along the first axis 16. In some examples, at least some of the cavities 48 may be filled with a resilient material (such as rubber) to increase the stiffness of the fixture apparatus 103 at that area.

The structure of the body 123 may include at least one rigid member 38 to enable an object to be positioned relative to the fixture apparatus 103 at a predetermined location (i.e. the rigid members 38 provide datum points for positioning an object relative to the fixture apparatus 103). In this example, the body 123 includes three relatively solid, rigid blocks of plastic that extend parallel to the Y axis 30 from the first substrate 41. The rigid members 38 are positioned within the array of support members 36. The rigid members 38 may comprise the same material as the support members 36, or may comprise a different material.

The contact surface defined by the second parts 46 of the support members 36 may be shaped to correspond with an object to be retained. The contact surface may be shaped by varying the lengths of the first and second parts 44, 46 in the Y axis 30.

In some examples, the structure of the body 123 has variable stiffness along a second axis of the body 123 (the second axis being parallel to the Z axis 32 in this example). The variable stiffness along the second axis of the body 123 is provided by the support members 36 having varying characteristics along the second axis. For example, the first parts 44 of the support members 36 may have varying lengths and/or thicknesses along the second axis.

FIG. 5 illustrates a cross sectional perspective view diagram of another fixture apparatus 104 according to various examples. The fixture apparatus 104 is similar to the fixture apparatus 10, 101, 102, 103 and where the features are similar, the same reference numerals are used. FIG. 5 also illustrates a Cartesian coordinate axis 26 that includes an X axis 28, a Y axis 30 and a Z axis 32 that are orthogonal to one another.

The fixture apparatus 104 includes a body 124 comprising a plurality of support members 36, a resilient member 50, and a substrate 41 that is arranged to provide a backing plate for the support members 36. The structure of the body 124 has variable stiffness along at least a first axis 16 of the body 124 (the first axis 16 being parallel to the X axis 28 in this example).

The substrate 41 is substantially planar and is oriented parallel to the plane defined by the X axis 28 and the Z axis 32. The plurality of support members 36 extend from the substrate 41 parallel to the Y axis 30 and have a shape that tapers from their base at the substrate 41 to their ends. In other examples, the support members 36 may have a different shape and may have a serpentine configuration (as illustrated in FIGS. 2A, 2B, 2C) or have the structure illustrated in FIG. 4.

The resilient member 50 may comprise any suitable resilient material and may comprise rubber for example. The resilient member 50 is mounted on the substrate 41 and provides a contact surface for supporting and retaining an object. The plurality of support members 36 are embedded within the resilient member 50 and consequently adjust the stiffness of the resilient member 50.

The variable stiffness of the body 124 along the first axis 16 may be provided by varying the density of the support members 36 along the first axis 16. Additionally or alternatively, the variable stiffness of the body 124 along the first axis 16 may be provided by varying the thickness and/or the length of the support members 36.

In some examples, at least one of the support members 36 may protrude through the contact surface 17 defined by the resilient member 50 to provide a datum locator for the object to be retained.

In some examples, the structure of the body 124 has variable stiffness along a second axis of the body 124 (the second axis being parallel to the Z axis 32 in this example). The variable stiffness along the second axis of the body 124 is provided by the support members 36 having varying characteristics along the second axis. For example, the density of the support members 36 may vary along the second axis.

FIGS. 6B and 6C illustrate a further fixture apparatus 105 according to various examples. The fixture apparatus 105 is similar to the fixture apparatus 10, 101, 102, 103, 104 and where the features are similar, the same reference numerals are used. FIGS. 6B and 6C also illustrate a Cartesian coordinate axis 26 that includes an X axis 28, a Y axis 30 and a Z axis 32 that are orthogonal to one another.

The fixture apparatus 105 includes a body 125 comprising a three dimensional lattice of elements 52 interconnected by a plurality of support members 36 (which may be referred to as cross-links in this example), and a cover 40 that may provide a contact surface 17 for supporting (and retaining) an object. The structure of the body 125 has variable stiffness along at least a first axis 16 of the body 125 (the first axis 16 being parallel to the X axis 28 in this example).

As illustrated in FIG. 6A, an element 52 comprises a cube shaped frame which is coupled to six supporting member 36 on each face. It should be appreciated that an element 52 may have any polyhedral shape and may have any number of coupled supporting members 36.

The variable stiffness of the body 125 along the first axis 16 may be provided by the varying the density of support members 36 along the first axis 16. As illustrated in FIG. 6B, a first region 54 includes no vertical support members 36 (i.e. support members 36 that extend parallel to the Y axis 30) and a second region 56 includes no vertical support members 36. The stiffness of the body 125 along the first axis 16 in the Y axis 30 varies because locations outside of the first and second regions 54, 56 have relatively high stiffness, the location of the second region 56 outside of the first region 54 has a medium stiffness, and the location where the first and second regions 54, 56 overlap has a low stiffness.

It should be appreciated that the stiffness of the body 125 may vary in other directions by varying the density of support members 36 that extend parallel to the X axis 28 and parallel to the Z axis 32.

The variable stiffness of the body 125 may additionally or alternatively be provided by varying the length of the support members 36 (where longer support members 36 are less stiff). Furthermore, the variable stiffness of the body 125 may additionally or alternatively be provided by varying the number of support members 36 per element 52 (where a greater number of support members 36 per element 52 increases the stiffness of the body 125) material of the closed cells 36 along the first axis 16.

Figure 7:
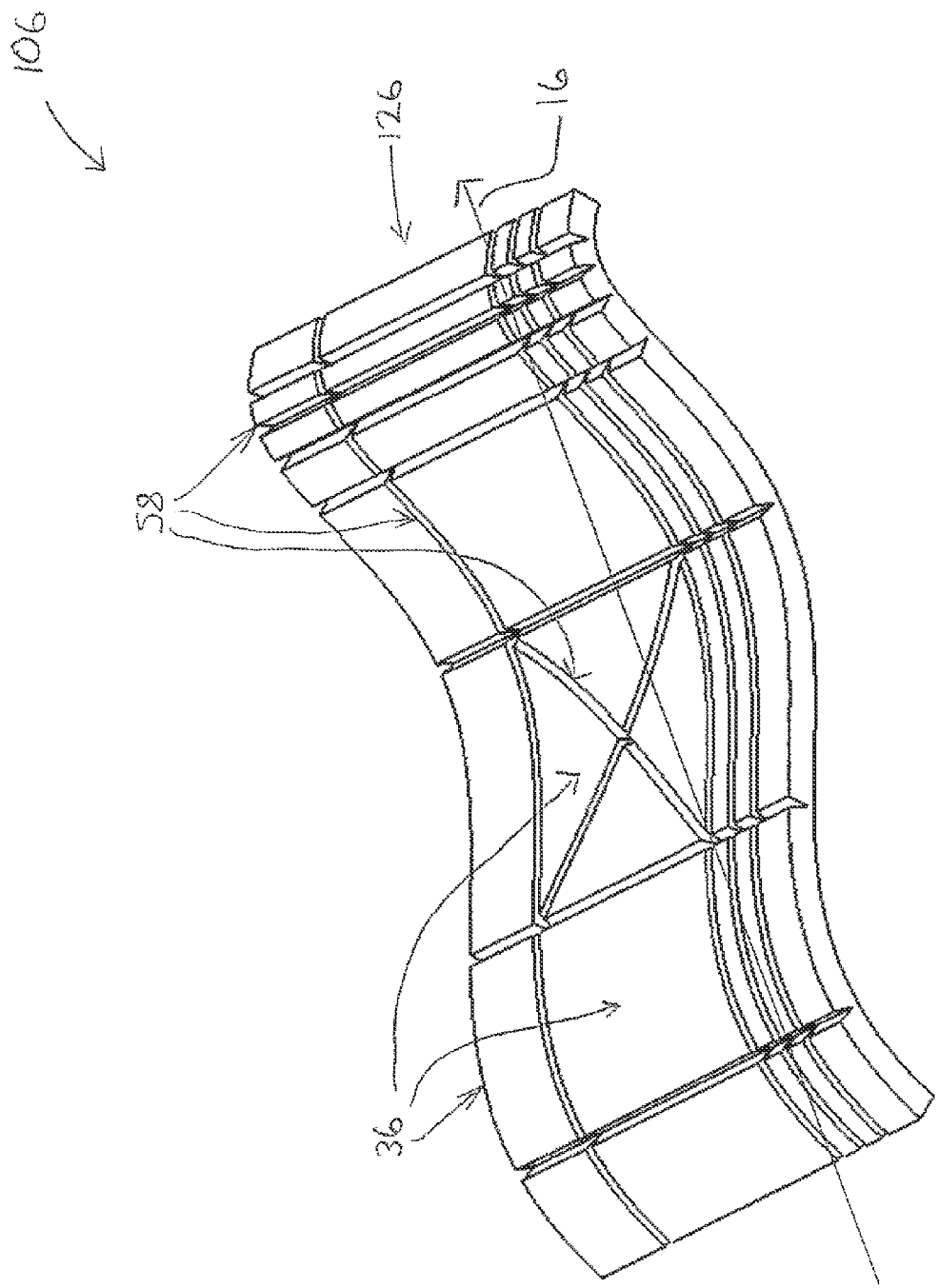
FIG. 7 illustrates a perspective view diagram of another fixture apparatus according to various examples.

FIG. 7 illustrates a perspective view diagram of another fixture apparatus 106 according to various examples. The fixture apparatus 106 is similar to the fixture apparatus 10, 101, 102, 103, 104, 105, and where the features are similar, the same reference numerals are used.

The fixture apparatus 106 includes a body 126 (a sheet of plastic in this example) comprising a plurality of support members 36 defined by a plurality of grooves 58 in the body 126. The grooves 58 locally weaken the body 126 and enable the body 126 to have a variable stiffness along the first axis 16. The thickness of the body 126, the depth of the grooves 58 and the density of grooves 58 in a given area affect the local stiffness of the fixture apparatus 106.

Since the grooves 58 define the plurality of support members 36, it may be considered that the density, the length and the width of the support members 36 may be varied along the first axis 16 to provide the variable stiffness.

Figure 8:
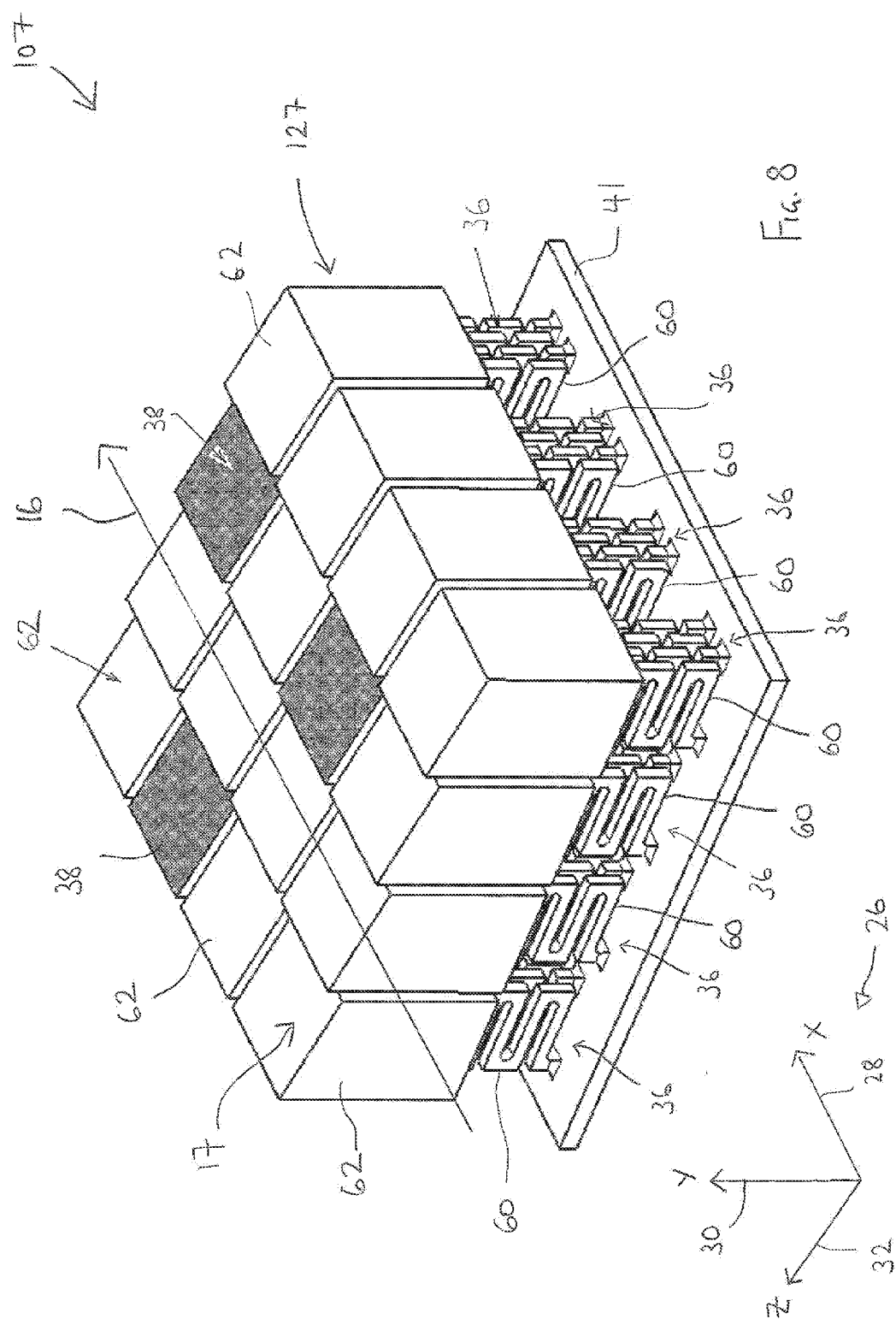
FIG. 8 illustrates a perspective view diagram of a further fixture apparatus according to various examples.

FIG. 8 illustrates a perspective view diagram of a further fixture apparatus 107 according to various examples. The fixture apparatus 107 is similar to the fixture apparatus 10, 101, 102, 103, 104, 105, 106 and where the features are similar, the same reference numerals are used. FIG. 8 also illustrates a Cartesian coordinate axis 26 that includes an X axis 28, a Y axis 30 and a Z axis 32 that are orthogonal to one another.

The fixture apparatus 107 includes a body 127 comprising a plurality of support members 36, and a substrate 41 The structure of the body 127 has variable stiffness along at least a first axis 16 of the body 123 (the first axis 16 being parallel to the X axis 28 in this example).

The plurality of support members 36 are arranged in an array and extend parallel to the Y axis 30 from the substrate 41 and include a first part 60 and a second part 62. The first part 60 extends from the first substrate 41 at a first end and is coupled to the second part 62 at a second end. The first part 60 includes a plurality of elongate members having a serpentine configuration and extending back and forth in the Z axis 32 and the Y axis 30. The second part 62 extends from the first part 60 and defines a part of a contact surface 17 for supporting and retaining an object. The second part 62 has a cuboid shape and is thicker than the first part 60 at least in the X axis 28. The variable stiffness of the body 127 along the first axis 16 may be provided by varying the length and thickness of the first part 60 of the support members 36.

The structure of the body 127 may include at least one rigid member 38 to enable an object to be positioned relative to the fixture apparatus 107 at a predetermined location. In this example, the body 127 includes three relatively solid, rigid blocks of plastic that extend parallel to the Y axis 30 from the substrate 41. The rigid members 38 are positioned within the array of support members 36, or may comprise a different material.

The contact surface 17 defined by the second parts 62 of the support members 36 may be shaped to correspond with an object to be retained. The contact surface may be shaped by varying the lengths of the first and second parts 60, 62 in the Y axis 30.

Figure 9:
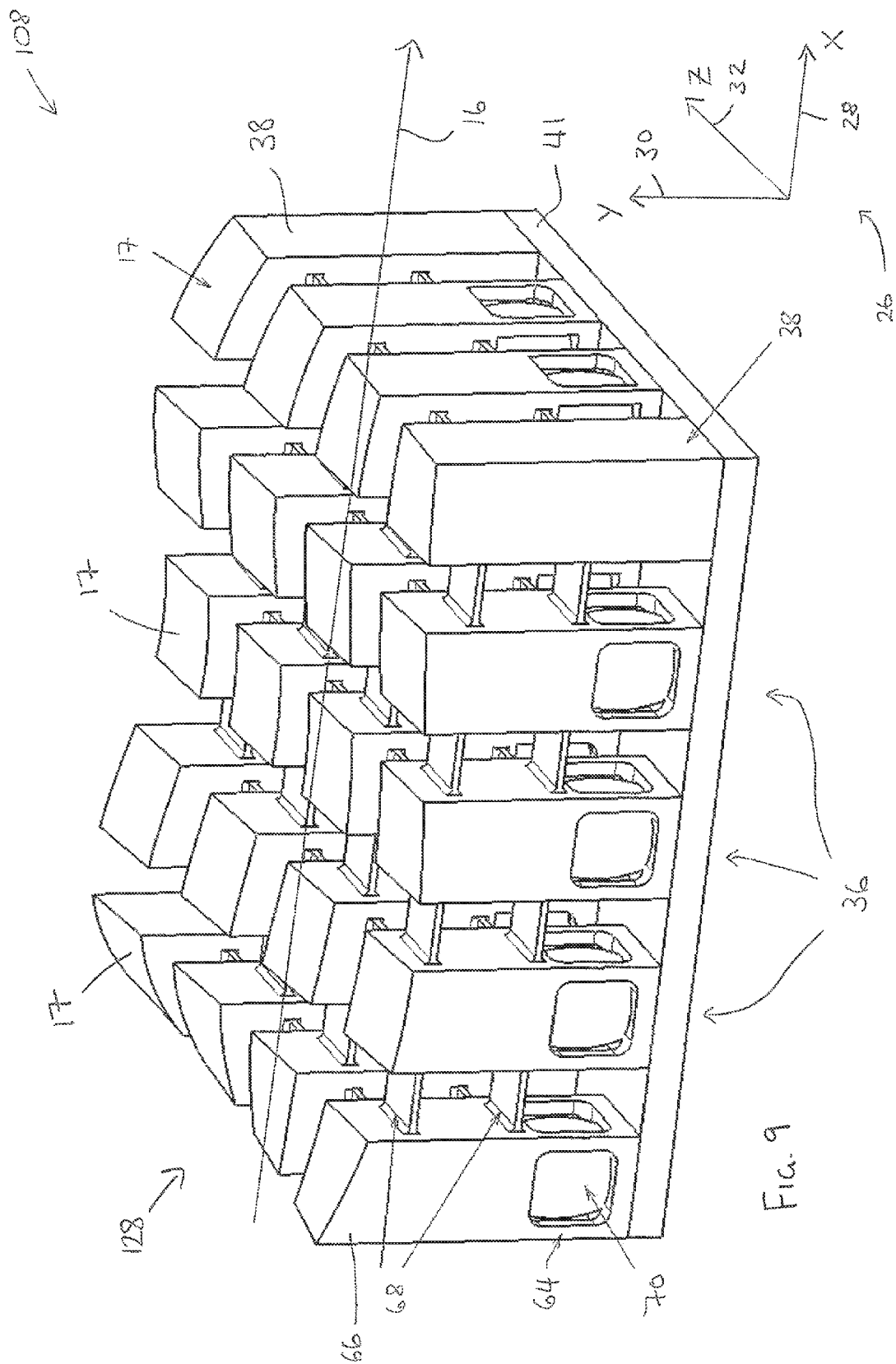
FIG. 9 illustrates a perspective view diagram of another fixture apparatus according to various examples.

FIG. 9 illustrates a perspective view diagram of another fixture apparatus 108 according to various examples. The fixture apparatus 108 is similar to the fixture apparatus 10, 101, 102, 103, 104, 105, 106, 107 and where the features are similar, the same reference numerals are used. FIG. 9 also illustrates a Cartesian coordinate axis 26 that includes an X axis 28, a Y axis 30 and a Z axis 32 that are orthogonal to one another.

The fixture apparatus 108 includes a body 128 comprising a plurality of support members 36, and a substrate 41 The structure of the body 128 has variable stiffness along at least a first axis 16 of the body 128 (the first axis 16 being parallel to the X axis 28 in this example).

The plurality of support members 36 are arranged in an array and extend parallel to the Y axis 30 from the substrate 41 and include a first part 64 and a second part 66. The first part 64 extends from the first substrate 41 at a first end and is coupled to the second part 66 at a second end. The first part 64 includes a plurality of elongate members extending parallel to the Y axis 30. In this example, the first part 64 includes four elongate members that are arranged in a square configuration and define a cavity there between.

The second part 66 extends from the first part 64 and defines a part of a contact surface 17 for supporting and retaining an object. The second part 66 has a generally cuboid shape and is coupled to the elongate members of the first part 64. The variable stiffness of the body 128 along the first axis 16 may be provided by varying the density, length and thickness of the elongate members of the first part 64 of the support members 36.

The body 128 also includes a plurality of spacers 68 that extend between second parts 66 of adjacent support members 36 parallel to the X axis 28. The spacers 68 prevent relative movement between adjacent support members 36 in the X axis 28.

The structure of the body 128 may include at least one rigid member 38 to enable an object to be positioned relative to the fixture apparatus 108 at a predetermined location.

The contact surface defined by the second parts 66 of the support members 36 may be shaped to correspond with an object to be retained. The contact surface may be shaped by varying the lengths of the first and/or second parts 64, 66 in the Y axis 30.

A resilient member 70 (comprising rubber for example) may be positioned within the cavity defined between the elongate members 64 of the first part 64. The resilient member 70 may increase the stiffness of the fixture apparatus 108 and provide additional dampening of mechanical forces.

Figure 10:
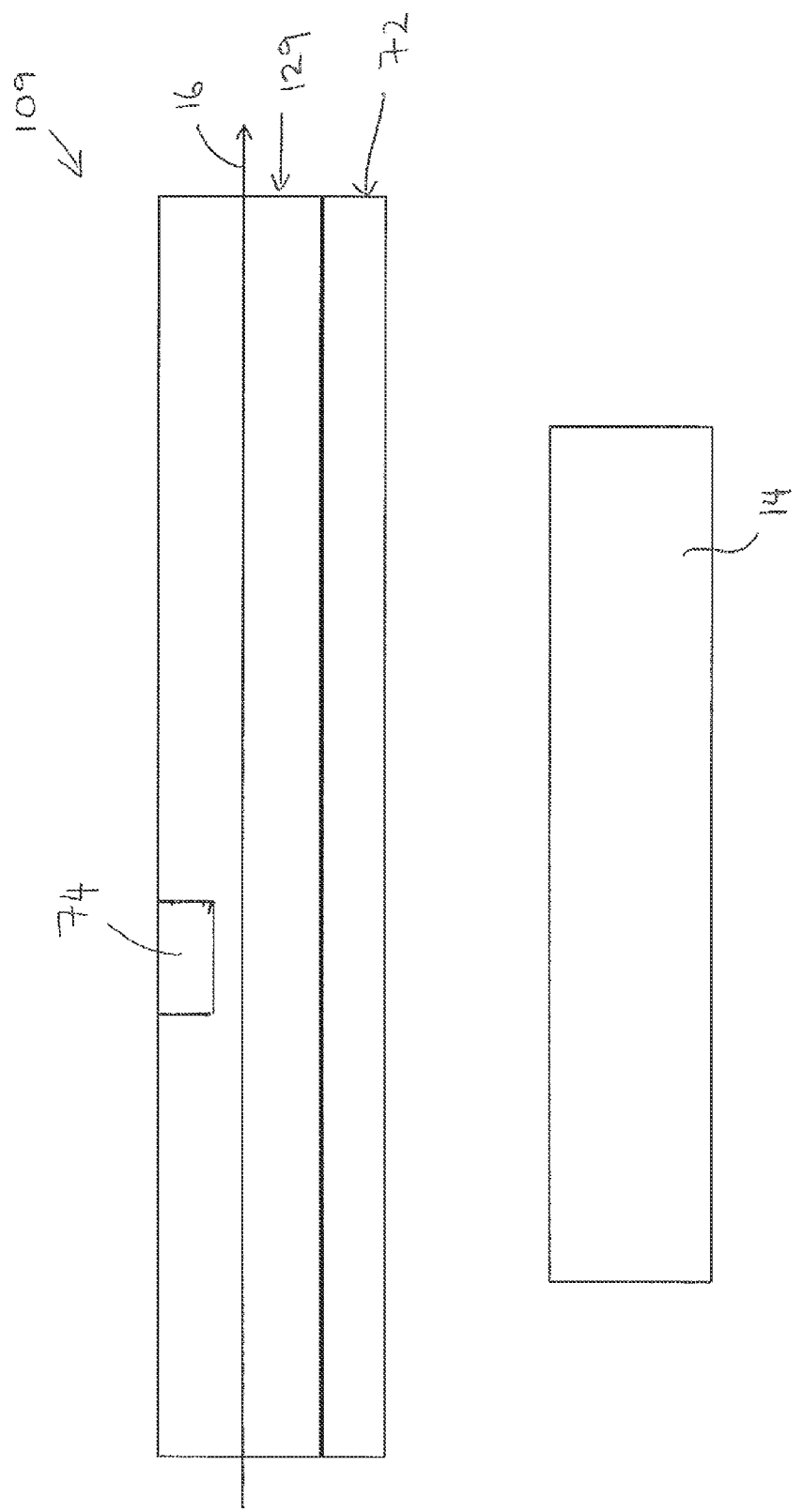
FIG. 10 illustrates a schematic diagram of fixture apparatus comprising a first body and a second body according to various examples.

FIG. 10 illustrates a schematic diagram of fixture apparatus 109 comprising a first body 109 and a second body 72 according to various examples. The first body 109 may comprise any one or more of the bodies 12, 121, 122, 123, 124, 125, 126, 127, 128 illustrated in FIGS. 1 to 9 respectively. The second body 72 is coupled to the first body 109 and provides a surface for supporting and retaining the object 14. In some examples, the second body 72 has variable stiffness along at least a first axis of the second body 72 (for example, the second body 72 may comprise the body 126 illustrated in FIG. 7). In other examples, the second body 72 may have a constant stiffness along the first axis 16.

In this example, the first body 129 includes comprises at least one sensor 74 and associated electrical circuitry. For example, the at least one sensor 74 may comprise a strain sensor, a thermal sensor and/or a part present sensor. It should be appreciated that any of the bodies 12, 121, 122, 123, 124, 125, 126, 127, 128 illustrated in FIGS. 1 to 9 respectively may include at least one sensor.

Figure 11:
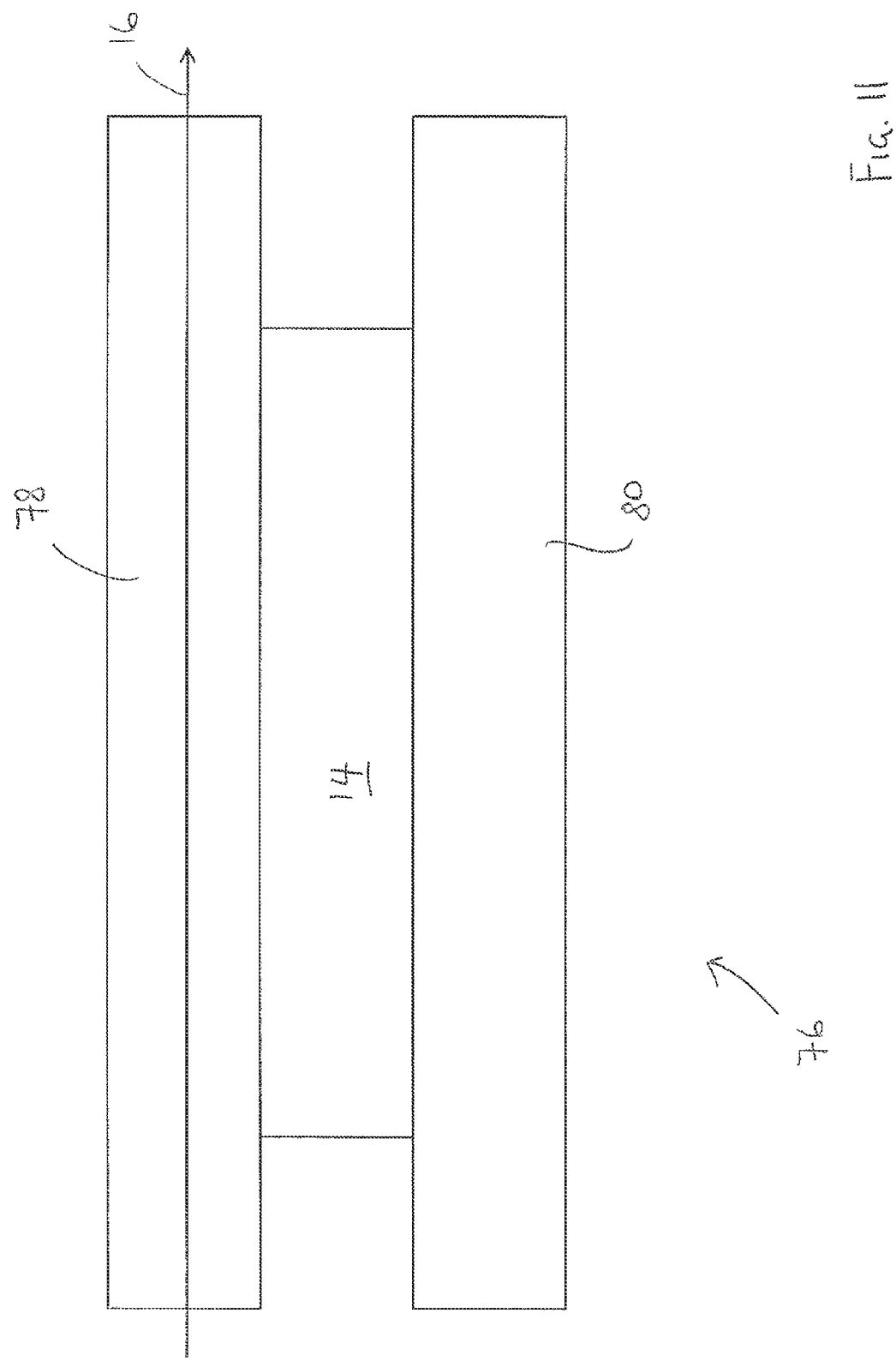
FIG. 11 illustrates a schematic diagram of a fixture according to various examples.

FIG. 11 illustrates a schematic diagram of a fixture 76 according to various examples. The fixture 76 includes a first fixture apparatus 78 and a second fixture apparatus 80 to retain an object 14 by clamping the object 14 there between.

The first fixture apparatus 78 includes a structure having variable stiffness along at least a first axis 16. For example, the first fixture apparatus 78 may comprise any one or combination of fixture apparatus 10, 101, 102, 103, 104, 105, 106, 107, 108, 109 illustrated in FIGS. 1 to 10 respectively.

In some examples, the second fixture apparatus 80 may also have a structure that has variable stiffness along an axis of the second fixture apparatus and may comprise any one or combination of fixture apparatus 10, 101, 102, 103, 104, 105, 106, 107, 108, 109 illustrated in FIGS. 1 to 10 respectively. In other examples, the second fixture apparatus 80 may have a structure that has constant stiffness.

Figure 12:
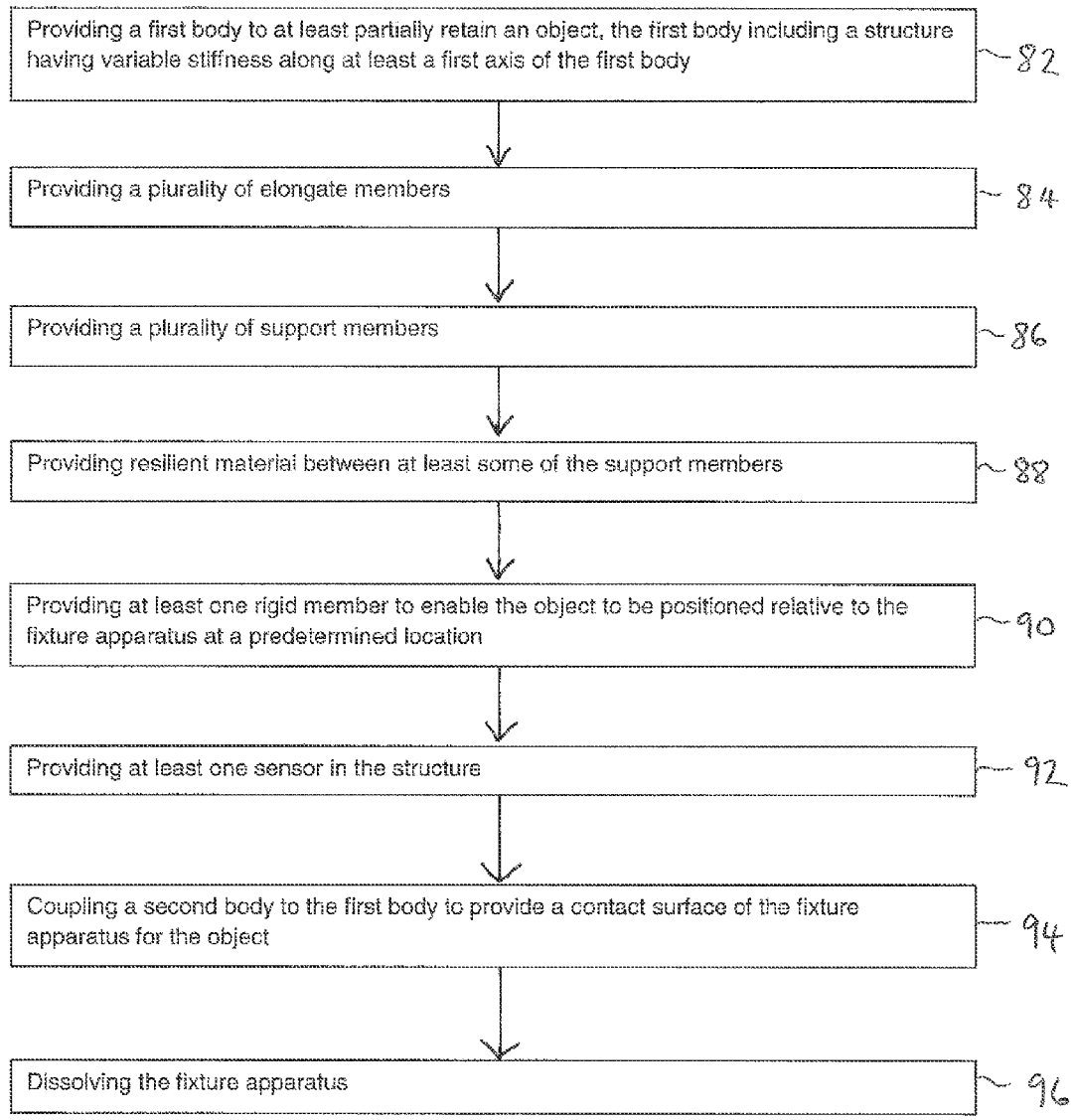
FIG. 12 illustrates a flow diagram of a method of manufacturing fixture apparatus according to various examples.

FIG. 12 illustrates a flow diagram of a method of manufacturing fixture apparatus according to various examples.

At block 82, the method includes providing a first body to at least partially retain an object. The first body includes a structure having variable stiffness along at least a first axis of the first body. At block 84, the method may include providing a plurality of elongate members. At block 86, the method includes providing a plurality of support members 36. At block 88, the method may include providing resilient material such as rubber between at least some of the support members. At block 90, the method may include providing at least one rigid member to enable the object to be positioned relative to the fixture apparatus at a predetermined location. At block 92, the method may include providing at least one sensor 74 in the structure of the first body. At block 94, the method may include coupling a second body to the first body to provide a contact surface of the fixture apparatus for the object.

It should be appreciated that blocks 82 to 94 may be performed by a three dimensional printer and may consequently be performed at substantially the same time. Additionally, in some examples, the fixture apparatus may be three dimensionally printed on an object. In other words, a pre-existing object 14 is placed within the three dimensional printer, and the fixture apparatus is printed on the object and consequently, the fixture apparatus and the object have a connecting interface. In other examples, the fixture apparatus and the object may be printed together by the three dimensional printer and consequently, the fixture apparatus and the object are integral with one another. In still further examples, the fixture apparatus may be three dimensionally printed in isolation of the object and may be fixed to the object after manufacture.

In some examples, the fixture apparatus is manufactured from dissolvable materials (such as water soluble plastic, i.e. Poly-vinyl alcohol (PVA); solvent dissolvable plastics, i.e. High Impact Polystyrene (HIPS) which is soluble in Limonene or polystyrene which is soluble in Acetone, or metal powder using these as binding agents, or acid/alkaline sensitive materials) to enable the fixture apparatus to be removed from the object. Consequently, at block 96, the method may include dissolving the fixture apparatus to remove the fixture apparatus from the object.

It will be understood that the invention is not limited to the embodiments above-described and various modifications and improvements can be made without departing from the various concepts described herein. For example, the body of fixture apparatus may not comprise support members and may instead include a plurality of different materials, having different stiffness values, along the first axis of the body.

Except where mutually exclusive, any of the features may be employed separately or in combination with any other features and the invention extends to and includes all combinations and sub-combinations of one or more features described herein in any form of fixture apparatus.

Except where mutually exclusive, any of the method blocks may be employed separately or in combination with any other method blocks and the invention extends to and includes all combinations and sub-combinations of one or more method blocks described herein.

What is claimed is:

1. Fixture apparatus comprising:
   a first body to at least partially support an object, the first body including a structure having variable stiffness along at least a first axis of the first body,
   wherein the structure comprises a plurality of support members, at least one characteristic of the plurality of support members varies along at least the first axis of the first body to provide the variable stiffness,
   wherein the structure includes a plurality of elongate members, and the plurality of support members form a plurality of cross links that extend between adjacent ones of the plurality of elongate members,
   wherein at least some of the plurality of elongate members have a serpentine configuration and are arranged to define a plurality of adjacent columns, and
   wherein a first portion of the support members extend between adjacent columns in a first dimension, and a second portion of the support members extend between adjacent elongate members within a column in a second dimension.

2. The fixture apparatus as claimed in claim 1, wherein the at least one characteristic of the plurality of support members is one of: length of the support members; a thickness of the support members; density of the support members; and material of the support members.

3. The fixture apparatus as claimed in claim 1, wherein the support members extend perpendicularly to the first axis of the first body.

4. The fixture apparatus as claimed in claim 1, wherein the structure of the first body includes at least one rigid member to enable the object to be positioned relative to the fixture apparatus at a predetermined location.

5. The fixture apparatus as claimed in claim 1, wherein the structure of the first body has variable stiffness along a second axis of the first body.

6. The fixture apparatus as claimed in claim 1, wherein the first body further comprises at least one sensor in the structure.

7. Apparatus comprising:
   the fixture apparatus as claimed in claim 1; and
   an object supported by the fixture apparatus.

8. The apparatus as claimed in claim 7, wherein the fixture apparatus is printed on the object and has a connecting interface with the object.

9. The apparatus as claimed in claimed in claim 7, wherein the fixture apparatus and the object are printed together and are integral to one another.

10. The apparatus as claimed in claim 7, wherein the fixture apparatus comprises a dissolvable material.

11. A method of manufacturing fixture apparatus, the method comprising:
    providing a first body to at least partially support an object, the first body including a structure having variable stiffness along at least a first axis of the first body, the structure comprising a plurality of support members and a plurality of elongate members, at least one characteristic of the plurality of support members varying along at least the first axis of the first body to provide the variable stiffness, the plurality of support members forming a plurality of cross links that extend between adjacent ones of the plurality of elongate members,
    wherein at least some of the plurality of elongate members have a serpentine configuration and are arranged to define a plurality of adjacent columns, and
    wherein a first portion of the support members extend between adjacent columns in a first dimension, and a second portion of the support members extend between adjacent elongate members within a column in a second dimension.

12. The method according to claim 11, further comprising providing at least one sensor in the structure.

13. The method as claimed in claim 11, wherein the fixture apparatus is provided by printing the fixture apparatus on the object, the fixture apparatus and the object having a connecting interface.

14. The method as claimed in claim 11, wherein the fixture apparatus is provided by printing the object and the fixture apparatus together so that they are integral to one another.

15. The method as claimed in claim 11, wherein the fixture apparatus comprises a dissolvable material and the method further comprises dissolving the fixture apparatus.

* * * * *